United States Patent

[11] 3,556,285

| [72] | Inventor | Robert Benjamin Bolton<br>14, Middle Drive, Ponteland,<br>Northumberland, England |
|---|---|---|
| [21] | Appl. No. | 830,952 |
| [22] | Filed | June 6, 1969 |
| [45] | Patented | Jan. 19, 1971 |
| [32] | Priority | June 7, 1968 |
| [33] | | Great Britain |
| [31] | | 27,165/68 |

[54] CONVEYORS
4 Claims, 3 Drawing Figs.

[52] U.S. Cl. .................................................. 198/176,
198/170
[51] Int. Cl. ................................................. B65g 19/00
[50] Field of Search ................................. 198/170,
175, 176

[56] References Cited
UNITED STATES PATENTS
| 300,247 | 6/1884 | Gordon ........................ | 198/70 |
| 2,529,663 | 11/1950 | Robinson .................... | 198/70 |

Primary Examiner—Andres H. Nielsen
Attorney—Jones and Lockwood

ABSTRACT: The specification describes chain conveyors intended for broken or fragmented solid materials. Such conveyors comprise an endless chain and a series of flights pivotally connected to the chain. The invention is concerned with controlling the extent of pivotal movement of the flights during the driving run. This control is accomplished by stop means on the pivotal connecting member cooperating with a pin extending substantially at right angles to the pivot axis.

CONVEYORS

This invention relates to chain conveyors for broken or fragmented solid materials.

The type of conveyor to which the invention relates comprises an endless chain extending along one side of the path along which it is desired to convey the material, a series of flights spaced along the chain, each flight being pivotally attached at one end portion about a vertical axis to the chain, there being means adapted to maintain the flights generally transversely to the said path during the driving run of the chain, the flights rotating backwardly about the pivots at the end of the driving run so that they assume a trailing attitude relative to their respective pivots during the return run. The pivotal mounting of each flight to the chain comprises a cylindrical shaft extending vertically from a link of the chain and a bearing surface for the shaft provided by a cylindrical bore extending vertically into the flight along the pivot axis.

A conveyor of this type will be referred to hereinafter as "of the kind described." The means for maintaining each flight generally transversely to the conveying path during the driving run comprises an inner trailing portion of the flight which can bear against a longitudinally extending bearing surface of the conveyor. While this latter device serves to prevent the flight from hinging backwardly during the driving run under the resistance of the material being conveyed, it nevertheless sometimes happens that the flights are swiveled forward to a certain extent during the driving run, particularly at the moment that the flights move into the driving run.

This may not matter if the conveyor is level as the movement of the conveyor chains will swing the flights transversely again but, if the conveyor is positioned along a slope such that the free ends of the flights are above the level of the chain, there may be a tendency for the flights to move along in the forwardly swiveled position, and it is therefore desirable to prevent this possibility from occurring.

According to the present invention a conveyor of the kind described has a flight mounting which comprises a rebate round the said cylindrical shaft, a bore extending horizontally into the flight and intersecting the aforesaid vertical bore at the level of the rebate in the cylindrical shaft, a pin inserted into the horizontal bore and engaging within the rebate, and a stop means within the rebate, said stop means being fast with the said cylindrical shaft and adapted to limit the extent to which the flight can swivel about the shaft, while still allowing the flight to swivel between a transverse position generally at right angles to the drive chain and a trailing position in line with the chain.

Preferably the said rebate extends only part way around the shaft, the ends of the rebate constituting the said stop means by providing shoulders for engagement with the said pin.

Preferably also, the stop means is adapted to permit the flight to swivel forwardly not more that 20° past a position at right angles to the chain.

A particular embodiment of this invention will now be described with reference to the accompanying drawing wherein.

Figure 1:
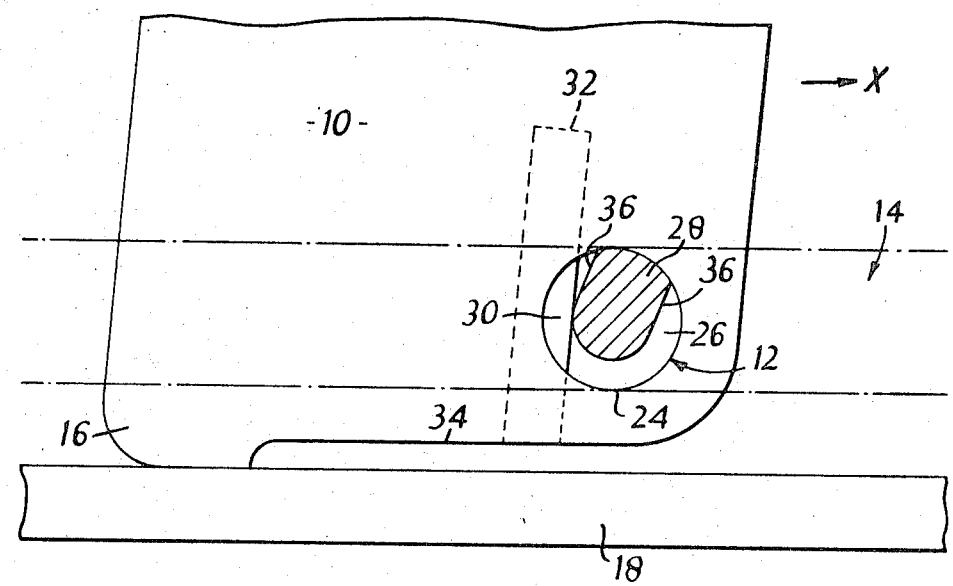
FIG. 1 shows in plan view the inner end portion of a flight of a conveyor of the kind described during the driving run.

Referring to FIG. 1 a flight 10 is pivotally attached at 12 to a drive chain, shown generally in dot-dash lines at 14. During the driving run in the direction of arrow X the flight is maintained substantially at right angles to the chain by means of a trailing shoulder 16 of the flight bearing against a longitudinal steel web 18 fixed to the conveyor (not shown).

Figure 2:
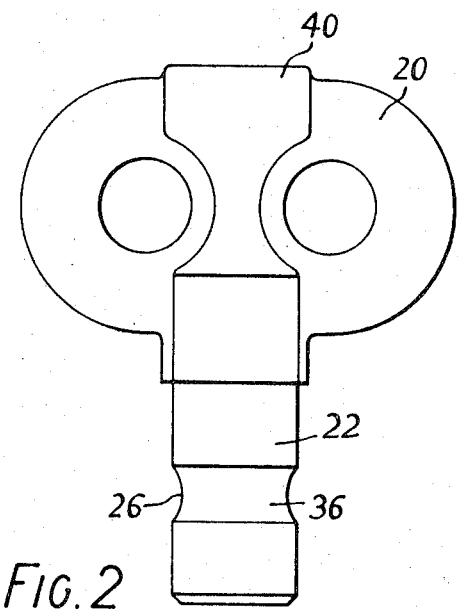
FIG. 2 shows in side elevation a link of the drive chain having a pivot shaft.
Figure 3:
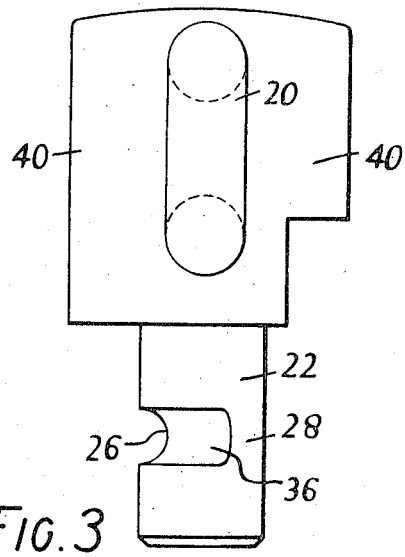
FIG. 3 shows an end view of the link of the chain shown in FIG. 2.

The flight 10 is pivoted to a link 20 of the chain by means of shaft 22 on the link bearing in a cylindrical bore 24 which extends vertically downwardly into the flight. The shaft 22 extends vertically downwardly from the link 20 and is provided with a rebate 26 of arcuate cross section. FIG. 1 also shows a cross section on the line A-A (FIG. 2) through the shaft 22 located within the cylindrical bore 24. The rebate 26 does not extend entirely around the shaft 22, the annulus being broken by the portion 28 of the shaft 22. The shaft 22 is retained in the bore 24 by means of a cylindrical steel pin 30 located in a bore 32 extending horizontally into the flight from the inside edge 34. The bore 32 intersects the bore 24 in such a manner that the pin 30 engages within the rebate 26 of the shaft 22 (see FIG. 1). This allows the flight 10 to rotate round the shaft 22, but prevents axial movement of the shaft relatively to the flight. If the rebate 26 had been continuous then the flight 10 would have been allowed unlimited rotation in either direction (subject, of course, to other restraining factors). The portion 28 of the shaft which breaks the annulus provides two shoulders 36 which can engage the pin 30 and thereby act as a stop limiting the rotational movement of the flight 10. Each shoulder 36 is straight-sided and shaped so as to abut the pin 30 along the entire length of the shoulder when the flight 10 is at the limit positions. As shown in FIG. 1, the sides of the shoulders 36 are parallel to each other, and angled so as to allow the flight 10 about 20° of forward rotation and 160° of rearward rotation from the position shown (although rearward rotation is in fact prevented during the driving run by engagement of the shoulder 16 with the web 18).

The pin 30 may be fixed permanently to the flight or may be removable. It may be cylindrical as in this case or it may be any other suitable cross section e.g. rectangular. The cross section of the pin 30 should of course match that of the rebate 26 so as to provide as large an area of contact as possible and thereby reduce wear. The link 20 of the chain need not be a vertical link as shown but may be a horizontal link. It is usually found most convenient, however, to provide the pivot shafts 22 on vertical links. The shoulders 40 of the link act as a reinforcing support for the shaft 22, and also have other functions connected with the particular conveyor. They are not, of course, essential to the present invention. Although the stop means in the embodiment illustrated is provided by a solid portion 28 of the shaft, the rebate 26 may be formed as a continuous annulus, and a suitable stop means secured to a desired part of the rebate, e.g. by bolting or welding. Thus, the position of the stop could be chosen to suit individual requirements, or even be made adjustable. In the present embodiment, about 20° of forward swiveling movement has been allowed, and it has been found convenient to allow a small degree of forward rotational movement in this way. The stop could, however, be located so as to allow substantially no forward rotational movement during the driving run.

I claim:

1. In a conveyor having:
   a. an endless chain extending along one side of the path along which it is desired to convey material;
   b. a series of flights spaced along the said chain;
   c. pivotal mounting about a vertical axis between one end portion of each said flight and the said chain comprising:
      i. a cylindrical shaft extending vertically from a link of the chain; and
      ii. a cylindrical bore providing a bearing surface for the shaft extending vertically into the flight along the pivot axis; and
   d. means adapted to maintain the flights generally transversely to the said path during the driving run of the chain, the flights rotating backwardly about the pivots at the end of the driving run so that they assume a trailing attitude relative to their respective pivots during the return run, an improved mounting for the flights which comprises a rebate round the said cylindrical shaft, a bore extending horizontally into the flight and intersecting the aforesaid vertical bore at the level of the rebate in the cylindrical shaft, a pin inserted into the horizontal bore and engaging within the rebate, and a stop means within the rebate, said stop means being fast with the said cylindrical shaft and adapted to limit the extent to which the flight can swivel about the shaft, while still allowing the flight to swivel between a transverse position generally at right angles to the drive chain and a trailing position in line with the chain.

2. A conveyor according to claim 1 wherein the said rebate extends only part way around the shaft, the ends of the rebate constituting the said stop means by providing shoulders for engagement with the said pin.

3. A conveyor according to claim 2 wherein the stop means is adapted to permit the flights to swivel forwardly not more than 20° past a position at right angles to the chain.

4. A conveyor according to claim 2 wherein the shoulders present straight sides so as to abut the pin along the entire length of the shoulder when the shaft is in its limit position.